US012216833B1

(12) United States Patent
Stoppa et al.

(10) Patent No.: US 12,216,833 B1
(45) Date of Patent: Feb. 4, 2025

(54) SYSTEM FOR IMPROVING USER INPUT RECOGNITION ON TOUCH SURFACES

(71) Applicant: Apple Inc., Cupertino, CA (US)

(72) Inventors: Michele Stoppa, Sunnyvale, CA (US); Waleed Abdulla, Sunnyvale, CA (US); Henning Tjaden, Sunnyvale, CA (US); Sree Harsha Kalli, Sunnyvale, CA (US); Senem E. Emgin, Los Altos, CA (US); John B. Morrell, Los Gatos, CA (US); Seung Wook Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 18/355,006

(22) Filed: Jul. 19, 2023

Related U.S. Application Data

(63) Continuation of application No. 17/448,807, filed on Sep. 24, 2021, now Pat. No. 11,755,124.

(60) Provisional application No. 63/243,517, filed on Sep. 13, 2021, provisional application No. 63/083,481, filed on Sep. 25, 2020.

(51) Int. Cl.
*G06F 3/02* (2006.01)
*G06F 3/01* (2006.01)

(52) U.S. Cl.
CPC ............ *G06F 3/0219* (2013.01); *G06F 3/013* (2013.01); *G06F 3/017* (2013.01); *G06F 3/0213* (2013.01)

(58) Field of Classification Search
CPC ........ G06F 3/0219; G06F 3/013; G06F 3/017; G06F 3/0213
See application file for complete search history.

(56) References Cited

U.S. PATENT DOCUMENTS

| | | | |
|---|---|---|---|
| 9,880,629 B2 * | 1/2018 | Moscarillo | .............. G06F 3/017 |
| 2010/0149099 A1 | 6/2010 | Elias | |
| 2011/0102570 A1 | 5/2011 | Wilf | |
| 2012/0274567 A1 | 11/2012 | Suggs | |
| 2013/0082928 A1 | 4/2013 | Kim | |
| 2013/0257734 A1 | 10/2013 | Marti | |
| 2014/0176435 A1 | 6/2014 | Jiang | |
| 2014/0327618 A1 | 11/2014 | Jiang | |
| 2015/0220150 A1 | 8/2015 | Plagemann | |
| 2017/0102781 A1 | 4/2017 | Jiang | |

(Continued)

OTHER PUBLICATIONS

Green, Sam, "Augmented Reality Keyboard for an Interactive Gesture Recognition System," A dissertation submitted in fulfillment of the requirements for the degree: Masters in Computer Science at the School of Computer Science & Statistics, Trinity College Dublin, May 2016.

*Primary Examiner* — Andrew Sasinowski
(74) *Attorney, Agent, or Firm* — Blank Rome LLP

(57) ABSTRACT

A physical keyboard can be used to collect user input in a typing mode or in a tracking mode. To use a tracking mode, first movement data is detected for a hand of a user in relation to a physical keyboard at a first location. A determination is made that the first movement data is associated with a tracking movement. In response to determining that the movement type is associated with the tracking movement, a tracking mode is initiated. User input is provided based on the movement data and in accordance with the tracking mode. Contact data and non-contact data is used to determine a user intent, and a user instruction is processed based on the user intent.

20 Claims, 10 Drawing Sheets

(56) References Cited

U.S. PATENT DOCUMENTS

| | | | |
|---|---|---|---|
| 2018/0005437 A1* | 1/2018 | Anderson | G06F 3/0304 |
| 2018/0164910 A1* | 6/2018 | Ent | G06F 3/018 |
| 2018/0300054 A1 | 10/2018 | Yamada | |
| 2018/0350150 A1 | 12/2018 | Powderly | |
| 2019/0025979 A1 | 1/2019 | Lee | |
| 2019/0362562 A1* | 11/2019 | Benson | G06V 10/82 |
| 2020/0012354 A1 | 1/2020 | Cho | |

* cited by examiner

SYSTEM FOR IMPROVING USER INPUT RECOGNITION ON TOUCH SURFACES

BACKGROUND

Modern computing devices include numerous means for providing user input. Current laptops and many other computing systems utilize a physical keyboard and a touch-based navigation component, such as a touch pad, track pad, external mouse, joystick, track ball, or other device utilized to move a cursor on a display. When a user utilizes user input devices, a user's hands must move between the physical keyboard and the touch-based navigation component, which can be disruptive when switching from a typing input to a movement of the cursor. In addition, traditional contact-based user input suffers from noisy sensor data. Often the user's intent is not clear from the contact data. In other instances, input received via a physical keyboard, such as a separate keyboard device, a touch-based keyboard using a glass surface, and the like, it may be difficult to distinguish between intentional input and unintentional input. What is needed is an improved technique for receiving differing types of user inputs.

DETAILED DESCRIPTION

Figure 1:
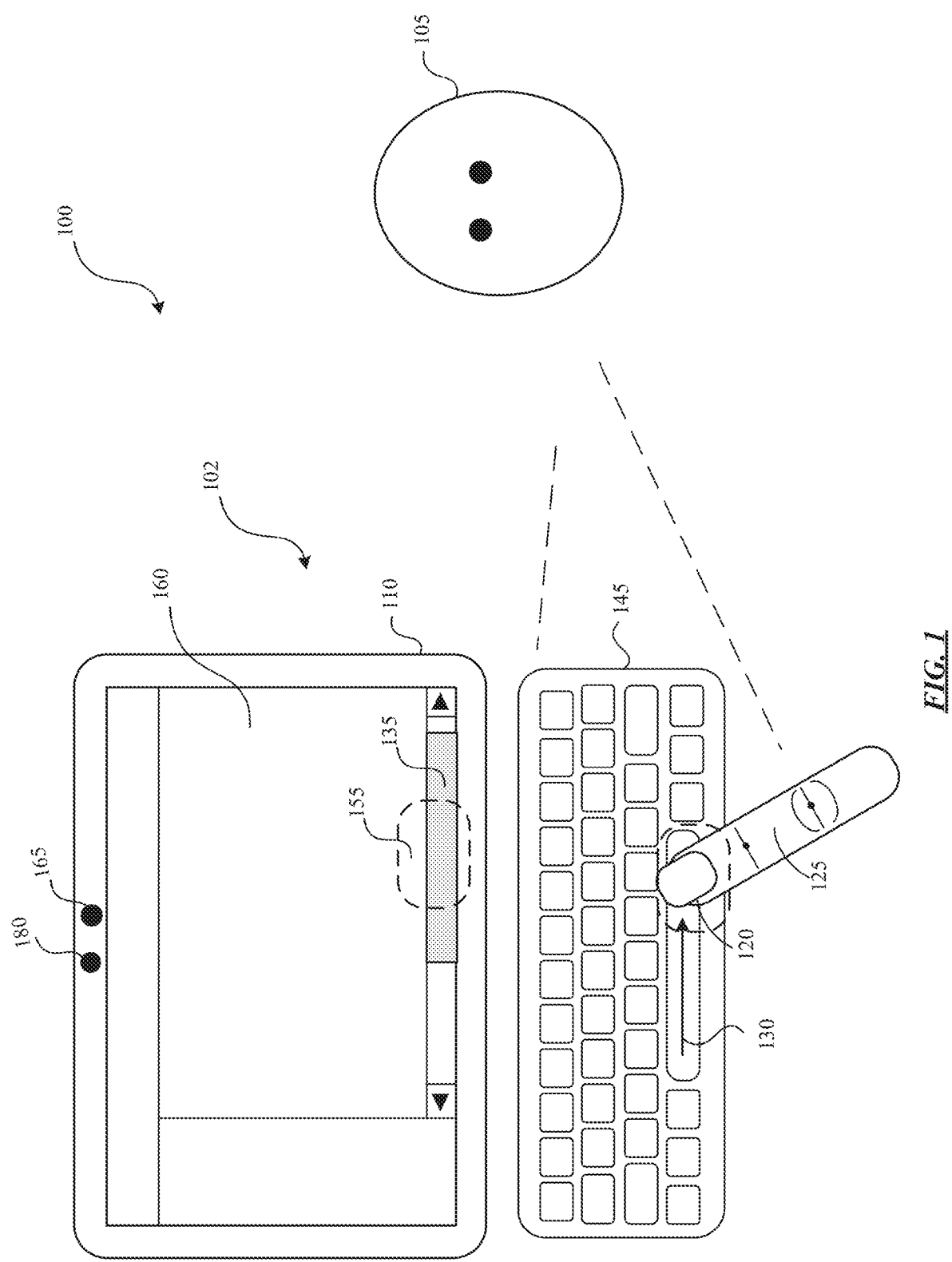
FIG. 1 shows a diagram of an example system setup, according to one or more embodiments.

This disclosure pertains to systems, methods, and computer-readable media to utilize a physical keyboard in multiple input modes, including a typing mode and a tracking mode, without the need for a specialized keyboard. Vision-based hand tracking may be utilized to detect whether user input should be determined based on a typing mode or a tracking mode. In a typing mode, the visual information is ignored, and input is received as intended by the physical keyboard. For example, a computer system may receive user input based on keys depressed on the physical keyboard and the like. In a tracking mode, visual information of a hand in relation to a keyboard may be utilized to obtain user input.

According to one or more embodiments, a tracking mode may be triggered based on a user gesture detected by visual means or by user input to the physical keyboard. For example, a particular key or combination of keys on the keyboard may trigger the tracking mode. The key or keys may be physically pressed or determined to be selected based on visual means by tracking a location of the hand in relation to the key or combination of keys. Further, a particular gesture may trigger the tracking mode, such as a touch or swipe on a predetermined part of the physical keyboard.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It should be appreciated that in the development of any actual implementation (as in any development project), numerous decisions must be made to achieve the developers' specific goals (e.g., compliance with system and business-related constraints) and that these goals will vary from one implementation to another. It will also be appreciated that such development efforts might be complex and time consuming but would nevertheless be a routine undertaking for those of ordinary skill in the art of image capture having the benefit of this disclosure.

For purposes of this disclosure, the term "camera system" refers to one or more lens assemblies, along with the one or more sensor elements and other circuitry utilized to capture an image. For purposes of this disclosure, the "camera" may include more than one camera system, such as a stereo camera system, a multicamera system, or a camera system capable of sensing the depth of the captured scene.

For purposes of this disclosure, the term "physical keyboard" refers to a device comprising a panel of keys which, when physically selected or pressed, provide user input to a system, such as a keyboard that is communicably connected to a computing device, a keyboard presented on a touch-based display from which contact is used to detect user input, and the like.

FIG. 1 shows an example system setup 100 in which techniques for utilizing a tracking mode on a physical keyboard are employed. Specifically, FIG. 1 shows a user 105 utilizing a physical keyboard 145 of a computing system 102 for vision-based input. Although various components and modules described herein are shown in a particular configuration, it should be understood that the various processes and components may be performed or substituted for other processes or components as described herein. It should be understood that the system setup 100 is depicted primarily as an example to aid in the understanding of the techniques described herein.

The example system setup 100 includes a user 105 using the physical keyboard 145 in a tracking mode. The user 105 may utilize the physical keyboard 145 with a touching object, such as the user's finger 125. Based on the configuration of the touching object (e.g., the user's finger 125), a determination may be made as to whether the physical keyboard 145 should be utilized in a typing mode or a tracking mode.

The determination and implementation of the touching mode and tracking mode may be performed by computing system 102. For purposes of this example, the processes and components are located and performed by the computing system, although it should be understood that in other embodiments, those processes and components may be included in a separate computing system.

The user 105 may use the physical keyboard 145 by placing at least a portion of the user's hand or hands, such as finger 125, on the physical keyboard 145. A spatial relationship may be determined between the user's hand, such as finger 125, and the physical keyboard 145 using image data and other visual information. For example, one or more cameras 180 may be used to obtain image data that includes the user's finger 125 (or other touching object) and the physical keyboard 145. Additional information may be obtained by other sensors 165, such as a depth sensor. The visual data (such as image data and depth data) may be used to determine whether contact occurs between the finger 125 and the physical keyboard 145.

User 105 may perform a predetermined movement, such as a swiping action or other gesture 130. The movement may be associated with a touch location 120 on the physical keyboard 145. In some embodiments, the gesture 130 and/or the touch location 120 may be utilized to determine whether a tracking criterion is satisfied. The tracking criterion may be a set of characteristics that indicate that the physical keyboard 145 should be used in tracking mode. Data that may be utilized to determine whether tracking criteria is satisfied may include, for example, a particular finger or part of the hand that makes contact with the physical keyboard 145, detection of a predetermined gesture, and the like. In some embodiments, the criteria may be based on a touch location 120 on the physical keyboard 145 at which touch is detected. In some embodiments, the tracking criteria may include non-vision-based information. For example, a particular physical key on the keyboard 145 or combination of keys, when pressed, may trigger initiation of the tracking mode.

In some embodiments, the tracking criterion may rely on additional data from user interaction with other components of the computing system 102. As shown, computing system 102 includes a display device 160 and a physical keyboard 145. Display device 110 may be used to present a user interface 160 for one or more applications. In some embodiments, gaze tracking data may be obtained to identify a portion of a user interface 160 at which the user's gaze is directed. For purposes of this example, the user's gaze is determined to be directed to gaze location 155, which is a portion of the user interface 160 associated with a scrollbar 135. In some embodiments, a tracking module may take into consideration the gaze location 155, along with the movement 130 to determine whether a tracking mode is intended (and thus the tracking criterion is satisfied). As an example, the tracking criteria may be considered to be met based on the combined indications of the swiping gesture 130, the gaze location 155, and the touch location 120.

Figure 2:
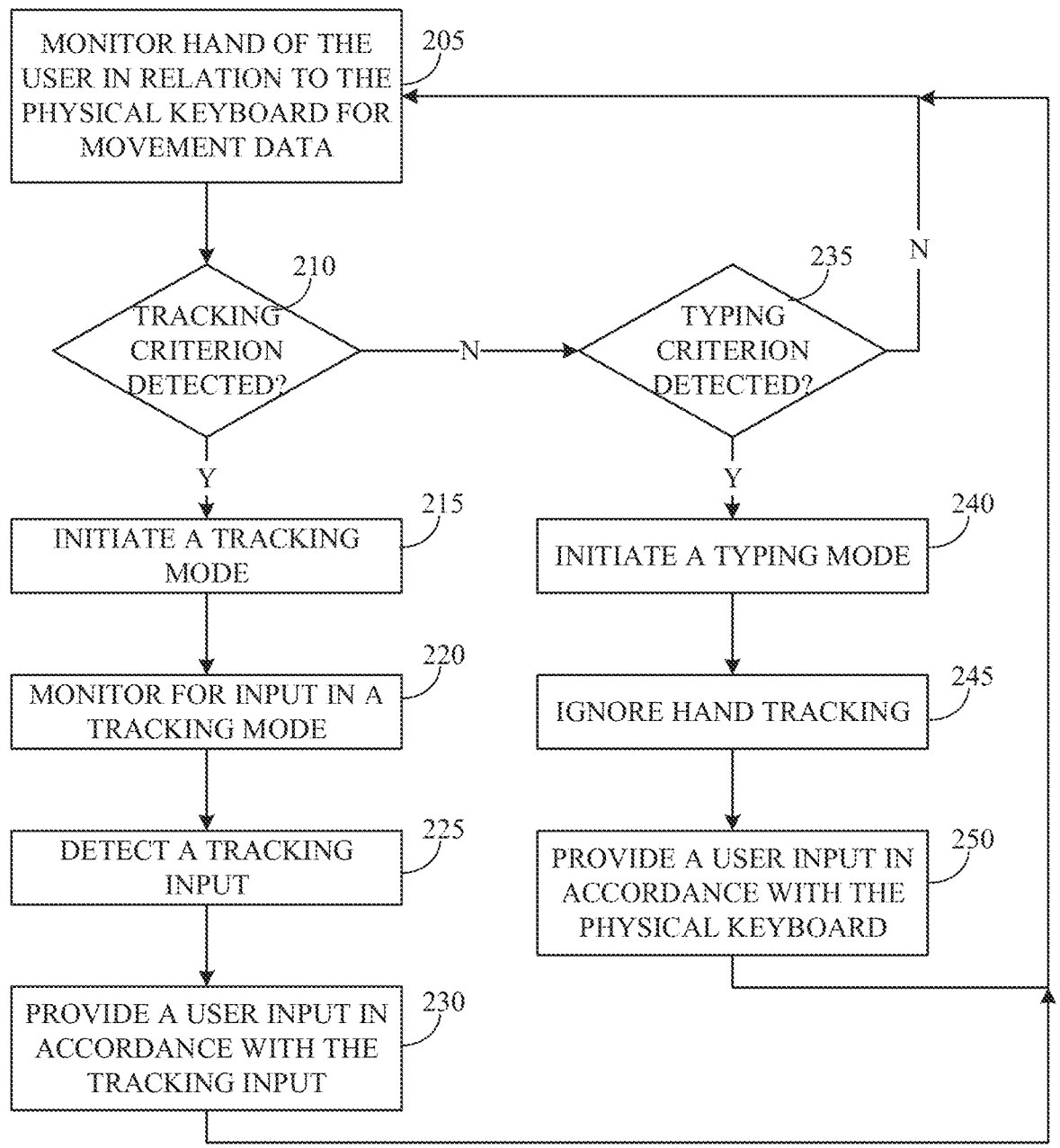
FIG. 2 shows a flowchart of a technique for determining whether to use a physical keyboard in a typing mode or a tracking mode.

FIG. 2 shows a flowchart of a technique for determining whether to use the physical keyboard in tracking mode or in typing mode, according to one or more embodiments. Although the various processes are described as being performed by particular modules and components, it should be understood that the various actions may be performed by alternate components. In addition, the various actions may be performed in a different order. Further, some actions may be performed simultaneously, some may not be required, or others may be added.

The flowchart begins at block 205, where the tracking module monitors a hand of the user in relation to the physical keyboard to detect movement data. In some embodiments, the tracking module may monitor a placement or location of any kind of touching object, such as a stylus or other physical object which a user is using to interact with a physical keyboard. The hand may be monitored in a variety of ways. For example, a movement of the hand may be tracked to detect a predetermined gesture. As another example, a location of the hand may be tracked in relation to the physical keyboard such that a placement of the hand in relation to various regions of the keyboard may be tracked if one or more regions of the keyboard are associated with a tracking mode. As another example, a placement of the hand may be tracked to determine whether a touch occurs between the keyboard and the hand such that depth information and hand tracking may be used to determine whether a touch has occurred between the hand and the keyboard. When a touch has occurred, a region of the physical keyboard may be identified where the touch location is located. Although the flowchart describes the hand of the user being monitored, in some embodiments both of the user's hands may be monitored. Further, one or more portions of the user's hand or hands may be monitored, such as an index finger placement, fingertip placement for one or more fingers, and the like.

In some embodiments, the hand may be monitored in relation to the physical keyboard based on physical input into the keyboard, such as key presses. As such, a movement may be detected when a particular key or combination of keys is pressed, such as with a typing movement. Movement data may be detected in the form of mechanical or other physical input to the physical keyboard.

The flowchart continues to block 210, where a determination is made as to whether a tracking criterion is satisfied. The tracking criterion may take into account various types of tracking information. For example, the visual data, user input, contextual information, and the like, or a combination thereof, may be considered to determine a confidence value that a tracking criterion has been met, as will be described in greater detail below with respect to FIG. 3. In some embodiments, the tracking criterion may be determined, for example, in relation to detected user input via the physical keyboard, such as an input from a predetermined key or combination of keys on the keyboard which trigger initiation of the tracking mode.

If at 210 a determination is made that the tracking criterion is satisfied, then the flowchart continues to block

215, where a tracking mode is initiated. At block 220, a tracking module monitors the keyboard for input in the tracking mode. Input may be detected in various ways. Key presses may be ignored in a tracking mode or may be associated with alternate input than in a typing mode. For example, a spacebar key press in tracking mode may provide an equivalent input as a left mouse click in a text editor. As another example, a particular key press may trigger initiation or end a tracking mode or typing mode. As yet another example, a particular key press may be part of a gesture associated with a particular input in the tracking mode.

In some embodiments, key presses detected during a tracking mode may be analyzed to determine if the key press was intentional and should be evaluated for input based on the tracking mode or should be ignored. The key press also may be evaluated based on other factors. As an example, if a key press is detected concurrently with a detected gesture, the key press may be determined to be ignored. As another example, if the key press is determined to be caused by another part of the hand besides the finger pad, for example, based on visual input, then the key press may be determined to be ignored. In some embodiments, a machine-learning network may be trained to detect intentional and unintentional key presses based on visual data. The trained network may be utilized to determine whether to consider a key press input when a key press is detected during a tracking mode.

The flowchart continues to block 225, where a tracking input is detected. The tracking input may be associated with a visual user input such as a gesture, physical input such as a key press, or a combination thereof. In addition, characteristics of the movement may be considered. For example, a direction of the gesture may indicate a movement of the cursor along that direction. As another example, a particular gesture may be associated with a particular shortcut or functionality of an application running on the computing system. The gesture may indicate a type of input. For example, a tapping motion and a swiping motion may provide two different inputs in the tracking mode such that a single tap may provide a different input than a double tap at a particular touch location on the physical keyboard. In addition, as described above, the gesture may include physical input to the physical keyboard, which may be processed in accordance with a tracking mode. That is, a particular physical input may be associated with a first action or data in a typing mode, and a second action or data in a tracking mode.

In some embodiments, the tracking input may include a gesture that begins on the physical keyboard and continues off of the physical keyboard. For example, as shown in FIG. 1 with respect to the scrollbar 135, a swiping gesture 130 by a finger may begin on the keyboard and continue off the keyboard. In some embodiments, the tracking input may be continuously utilized regardless of whether the gesture no longer makes contact with the physical keyboard. As such, a swiping gesture that begins on the physical keyboard and continues off the keyboard onto a surface may continue to be registered as a scrolling action in a tracking mode as long as the gesture is able to be captured and determined by an electronic device.

The flowchart continues to block 230, where user input is determined and provided in accordance with the tracking mode. As explained above, user input at the same location in a typing mode and in the tracking mode may differ. As an example, a user pressing the "J" key may be recognized by the computing system 100 as user input of "J." However, in a tracking mode, a tap or press on the letter "J" may indicate that selection of a input module on a user interface, regardless of whether or not the physical "J" key is pressed. Then the flowchart returns to block 205, where the system continues to monitor the hand to determine whether a change in the mode should occur.

At block 210, if a determination is made that the tracking criterion is not satisfied, then the flowchart continues to block 235. For example, in some embodiments, a determination may simply be made that the tracking criterion is no longer met or has not been met. In one or more embodiments, a confidence value may be utilized to determine whether the typing criteria has been met. As an example, if a user is utilizing the physical keyboard to press keys for user input, the typing criterion may likely be satisfied. In some embodiments, if it is unclear whether the typing criterion has been met (for example, if the confidence value does not satisfy a predetermined threshold), then the flowchart proceeds to 205 and the hand or other touching object is continuously monitored until the tracking or the typing criterion is satisfied.

If at block 235, it is determined that the typing criterion is detected/satisfied, then the flowchart continues to block 240. At block 240, a typing mode is initiated. In a typing mode, user input is received from the physical keyboard in accordance with keys that are pressed by the user on the physical keyboard. At block 245, hand tracking is ignored. For example, if the typing criterion is detected at 235, then hand gestures may be ignored during the typing in order to discount or otherwise not use tracking based gestures for user input. In some embodiments, hand tracking may not totally be ignored. If a particular gesture is utilized to initiate a tracking mode, the hand tracking may be utilized to monitor for that gesture. At block 250, user input is provided in accordance with the physical keyboard. For example, user input is determined based on key presses or combinations of key presses. As such, visual-based information may be ignored or not collected, or used to determine corresponding user input. After user input is provided at block 250, the hand of the user can be monitored again at block 205.

Figure 3:
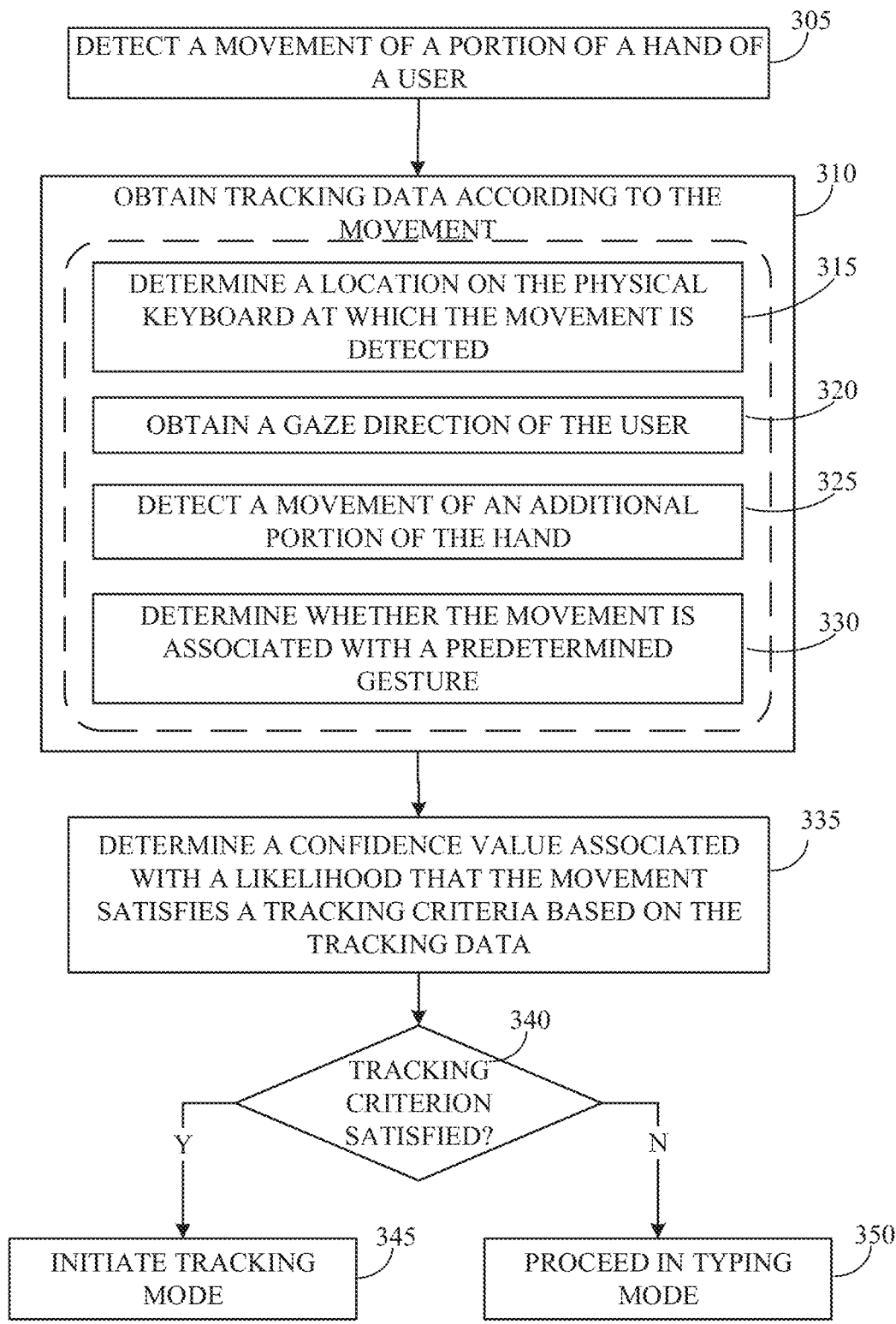
FIG. 3 shows a flowchart of a technique for detecting whether a tracking mode is initiated, according to some embodiments.

FIG. 3 shows, in flowchart form, an example technique for determining whether a tracking criterion is detected in accordance with some embodiments. For purposes of explanation, the following steps will be described in the context of FIGS. 1-2. However, it should be understood that the various actions may be performed by alternate components. In addition, the various actions may be performed in a different order. Further, some actions may be performed simultaneously, and some may not be required, or others may be added.

The flowchart begins at block 305, where a movement of a portion of the hand of user is detected. As described above, the movement may be a predetermined movement, such as a gesture or a predetermined user input that triggers a tracking criterion, such as a particular key press, combination of key presses, or the like. In some embodiments, the movement of the portion of the hand may be movement of one or more fingers or fingertips, or the like. Further, in some embodiments, the movement detected may be associated with movement of a touching object that a user utilizes to type on a physical keyboard.

The flowchart continues at 310, where the tracking module obtains tracking data according to the movement. In one or more embodiments, the tracking data may include vision-based data as well as contextual data from which a determination may be made regarding whether a tracking criterion is satisfied. Boxes 315-330 depict example processes for collecting various data, which may be obtained and considered to determine whether a tracking criterion is satisfied, according to some embodiments. At block 315, a location on the physical keyboard is determined at which the movement is detected. Referring back to FIG. 1, the touch location 120 may indicate a region on the physical keyboard 145 where the touch is detected. At block 320, a gaze direction of the user may be determined. In one or more embodiments, the gaze direction may be obtained from a user-facing camera or other sensor on computing system 100. The gaze direction may identify a location on a UI, such as gaze location 155 on user interface 160. The gaze direction may be used to identify, for example, a component of a user interface 160 at which the user's attention is directed.

At block 325, a movement of an additional portion of the hand is detected. In some embodiments, a particular touch by certain portions of a hand may be utilized to determine the intent of a user to utilize a tracking mode. As an example, if the fingertips of two fingers are used to tap or swipe, the movement may be identified as a movement for use in tracking mode. As another example, the system may determine that contact is unintentional if an index finger is not used to touch the physical keyboard but another part of the hand is, such as a palm, and the touch may be discounted in determining whether tracking mode should be used. At block 330, a determination is made as to whether the gesture is a predetermined gesture associated with initiation of a tracking mode. For example, a particular hand gesture may be used to identify that a tracking mode should be utilized. In addition, a predetermined hand pose may be used to identify that a tracking mode should be utilized.

The flowchart continues at block 335 where the tracking module determines a confidence value associated with a likelihood that the movement satisfies a tracking criterion based on the tracking data. In one or more embodiments, the confidence value may be determined based on some or all of the data described above with respect to block 310. The confidence value may take into consideration whether the detected movement is associated with a tracking-based input.

At block 340, a determination is made as to whether the tracking criterion is satisfied. In some embodiments, the tracking criterion is satisfied if the confidence value satisfies a threshold. If, at block 340, the tracking criterion is determined to be satisfied, then the flowchart continues to block 345 and tracking mode is initiated. In some embodiments, a user input is determined in tracking mode in accordance with the movement detected at 305. If the tracking criterion is not satisfied, then the flowchart continues to block 350 where the system proceeds in typing mode. In typing mode, user input is determined in typing mode in accordance with a user physically pressing keys on the physical keyboard, for example without vision-based input.

Figure 4:
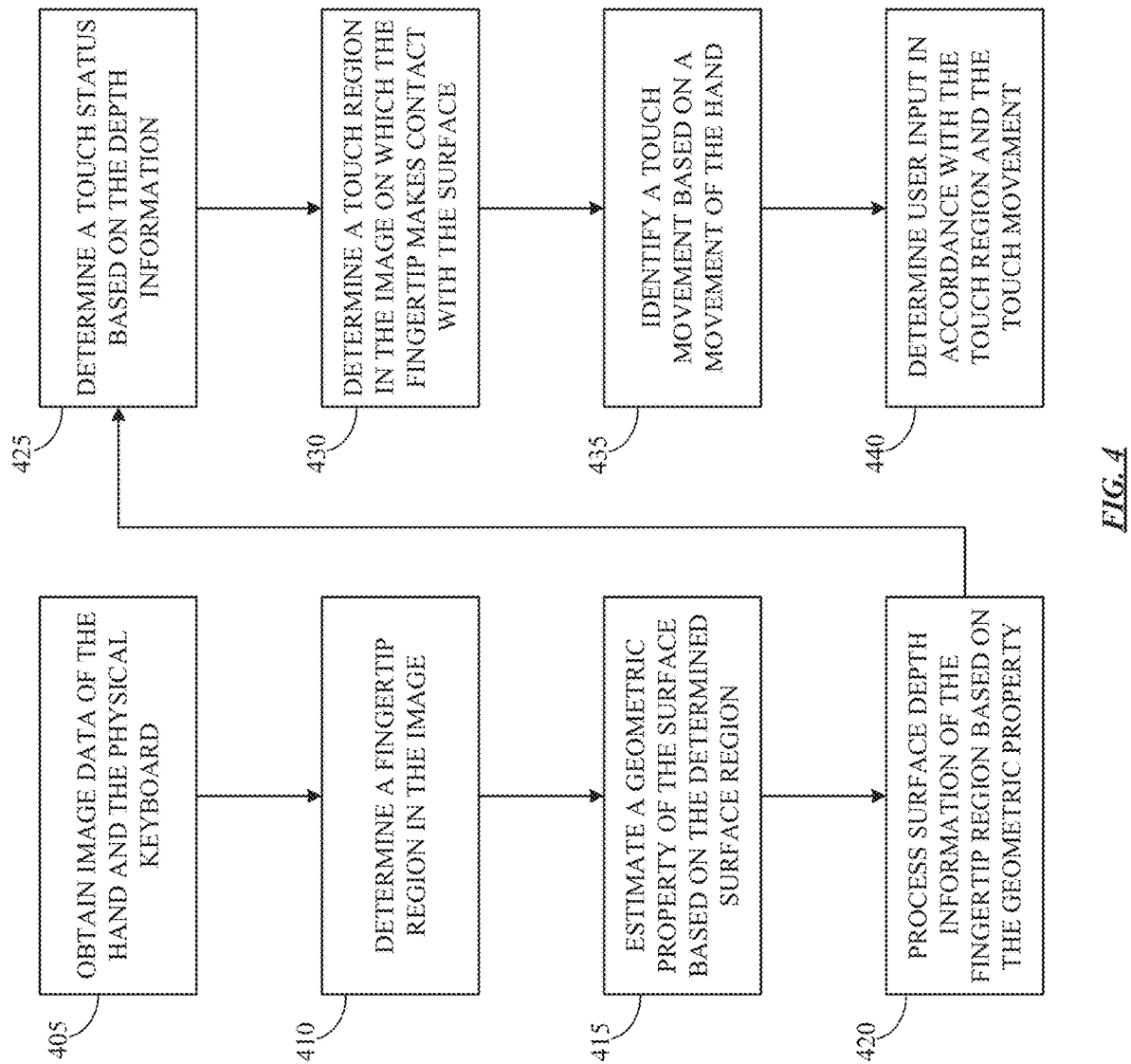
FIG. 4 shows a flowchart of a technique for detecting user input in a tracking mode, according to some embodiments.

FIG. 4 shows, in flowchart form, an example technique for determining user input in a tracking mode, in accordance with one or more embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart begins at 405 where one or more cameras capture image data representing the touching object and a target surface in an environment from the first viewpoint. As an example, cameras of the computing system 102 or electronic device 150 may be facing the environment in a direction of the physical keyboard 145 and touching object, such as finger 125. Further, in one or more embodiments, additional data may be captured, such as depth information, and the like.

The flowchart continues at 410, where the tracking module determines a fingertip region in the image. In some embodiments, the tracking module may access a model of a touching object, such as a finger. The model may be a model of a generic finger or a specific finger, such as that of a registered user of computing system 102, and may be used in conjunction with image data and/or depth data to determine a location in the environment in which the fingertip is located.

At 415, the tracking module estimates a geometric property of the surface based on the determined surface region. According to one or more embodiments, a depth of the surface over which a finger may be touching or hovering is determined. In one or more embodiments, depth information of the surface may be determined, for example, using a model of the surface or depth information for the surface captured in association with the image data and/or other depth data. The geometric property may include a point in space at which the physical keyboard is located behind the fingertip.

The flowchart continues at 420 where the tracking module processes surface depth information of the fingertip region based on the geometric property. According to one or more embodiments, the pose of the touching object may be determined, for example, in relation to the physical keyboard. Further, the pose of the touching object may be determined, for example, based on a coordinate system of the electronic device, a real world coordinate system, a coordinate system of the physical keyboard, or the like.

At 425 the tracking module determines a touch status based on the depth information. In one or more embodiments, depth information of the surface may be determined, for example, using a model of the keyboard, or depth information for the keyboard captured in association with the image data and/or other depth data. As such, a gap distance between the touching object and the physical keyboard may be calculated based on a determined depth of the fingertip or other touching object as compared to the physical keyboard over which the touching object is located. In one or more embodiments, the gap distance may be utilized to estimate the likelihood of a touch or otherwise make a determination as to whether a touch has occurred.

The flowchart continues at 430 where a touch module determines a touch region in the image on which the fingertip makes contact with the surface. In one or more embodiments, the touch region may be determined as the touch location 120 on the physical keyboard 145 over where the fingertip is hovering/touching when it is determined at 425 that a touch has occurred. According to one or more embodiments, the tracking module determines a touch region in the image on which the fingertip makes contact with the physical keyboard. Determining where the fingertip makes contact with the physical keyboard may involve determining a pose of the finger.

The flowchart continues at 435, where the tracking module identifies a touch movement based on a movement of the hand. The touch movement may include visual input, for example, a type of touch, such as a tap or a swipe, as well as a gesture or a portion of the user's hand producing the touch movement. Further, in some embodiments, the touch movement may be physical input, such as a key press or a combination of key presses. The flowchart concludes at block 440, where the user input is determined in tracking mode in accordance with the touch region and the touch movement.

According to some embodiments, user input recognition may also be improved by using contact sensor data and non-contact sensor data to determine user input on a user input device, such as a keyboard, track pad, touch pad, touch screen, and the like. For example, contact information, such as from contact sensors for user input devices may be refined using visual information of hand orientation and movement before and during contact. As such, the contact data from contact sensors may be enhanced by considering non-contact information to determine additional contextual data regarding a touch event. Non-contact information may be obtained from non-contact sensors, such as Radar/LiDar, RGB cameras, depth cameras, and the like. For example, typing recognition may be improved, unintentional contact events may be discarded, and the like. In addition, by enhancing contact data with visual data, user input may be improved by allowing for finger-specific user input, and the like.

Figure 5B:
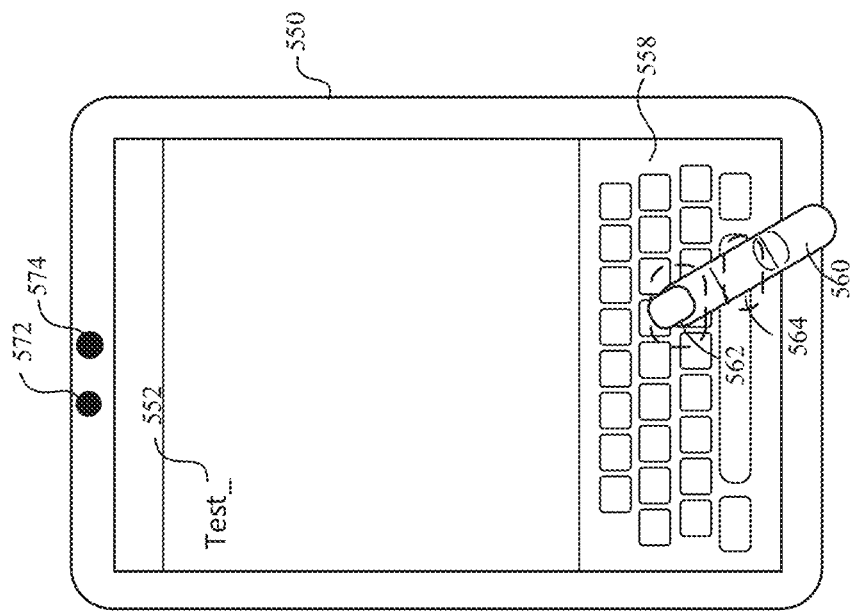
FIGS. 5A-B show example diagrams of system setups in which user input is received, according to one or more embodiments
Figure 5A:
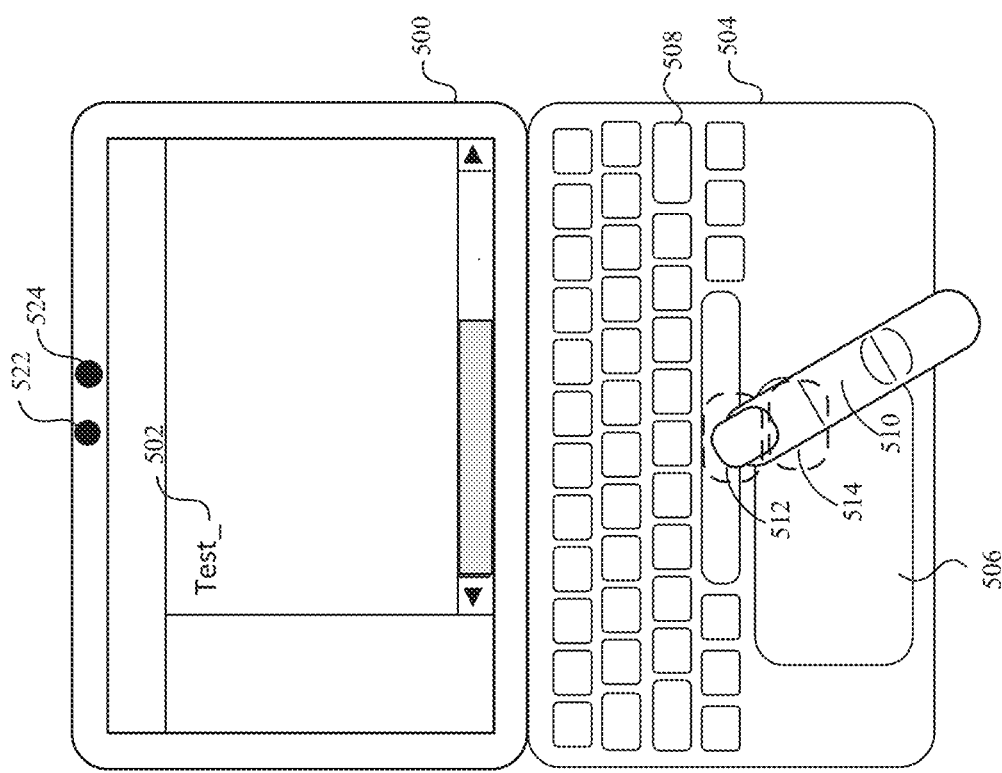

FIG. 5A shows an example system setup 500 in which techniques for determining intended user input from a touch-based physical keyboard. Specifically, FIG. 5A shows a user 510 utilizing user input devices 504, including a touch-based keyboard 508. Although various components and modules described herein are shown in a particular configuration, it should be understood that the various processes and components may be performed or substituted for other processes or components as described herein. It should be understood that the system setup 500 is depicted primarily as an example to aid in the understanding of the techniques described herein.

The user 510 may utilize the touch-based keyboard 508 with a touching object, such as the user's finger 510. The user 510 may use the touch-based keyboard 508 by placing at least a portion of the user's hand or hands, such as finger, on the physical keyboard 508. For example, a contact sensor or sensors associated with the user input devices 504 may be used to determine user input. Because the user input device 504 include multiple user input components, such as the individual keys of keyboard 508, and trackpad 506, occasionally a user may unintentionally enter user input, for example, with an unintended touch on a key, or by touching multiple portions of the devices at a time. As another example, a palm or other portion of the hand may unintentionally touch a portion of the user input device 504 and cause user input to be received. As shown, an intended touch point may be located at 512 in association with the touch-based keyboard, where an actual, or additional touch point may be located at 514, in association with the track pad. Accordingly, in some embodiments, a spatial relationship may be determined between the user's hand, such as finger 510, and the touch-based input devices 504 using image data and other visual information. For example, one or more cameras 522 may be used to obtain image data that includes the user's finger 510 (or other touching object) and the touch-based input devices 504. Cameras 572 may include, for example, visual-based cameras, depth cameras, IR-based depth sensors, such as LiDar, Radar, and the like. Additional information may be obtained by other sensors 524, such as a depth sensor. The visual data (such as image data and depth data) may be used to determine whether contact occurs between the finger 510 and the touch-based input devices 504. Accordingly, the intended user input may be used to provide user input for the user input portion 502 of the system 500.

FIG. 5B shows an alternate example system setup 550 in which techniques for determining intended user input from a touch-based physical keyboard in the configuration of a touch-based display. Specifically, FIG. 5B shows a user 560 utilizing user input devices 554, including a touch-based keyboard 558. Although various components and modules described herein are shown in a particular configuration, it should be understood that the various processes and components may be performed or substituted for other processes or components as described herein. It should be understood that the system setup 550 is depicted primarily as an example to aid in the understanding of the techniques described herein.

The user 560 may utilize the touch-based keyboard 558 with a touching object, such as the user's finger 560. The touch-based keyboard 558 may include, for example, a glass surface keyboard by which user input is detected using touch-based sensors. The user 560 may use the touch-based keyboard 558 by placing at least a portion of the user's hand or hands, such as finger, on the physical keyboard 558. For example, a contact sensor or sensors associated with the user input devices 554 may be used to determine user input. Because the user input device 554 include multiple user input components, such as the individual user input areas of touch-based keyboard 558, occasionally a user may unintentionally enter user input, for example, with an unintended touch on a key, or by touching multiple portions of the devices at a time. As shown, an intended touch point may be located at 562 in association with the touch-based keyboard, where an actual, or additional touch point may be located at 564, in association with the track pad. Accordingly, in some embodiments, a spatial relationship may be determined between the user's hand, such as finger 560, and the touch-based input devices 554 using image data and other visual information. For example, one or more cameras 572 may be used to obtain image data that includes the user's finger 560 (or other touching object) and the touch-based input devices 554. Cameras 572 may include, for example, visual-based cameras, depth cameras, IR-based depth sensors, such as LiDar, Radar, and the like. Additional information may be obtained by other sensors 574, such as a depth sensor. The visual data (such as image data and depth data) may be used to determine whether contact occurs between the finger 560 and the touch-based input devices 554. Accordingly, the intended user input may be used to provide user input for the user input portion 552 of the system 550.

Figure 6:
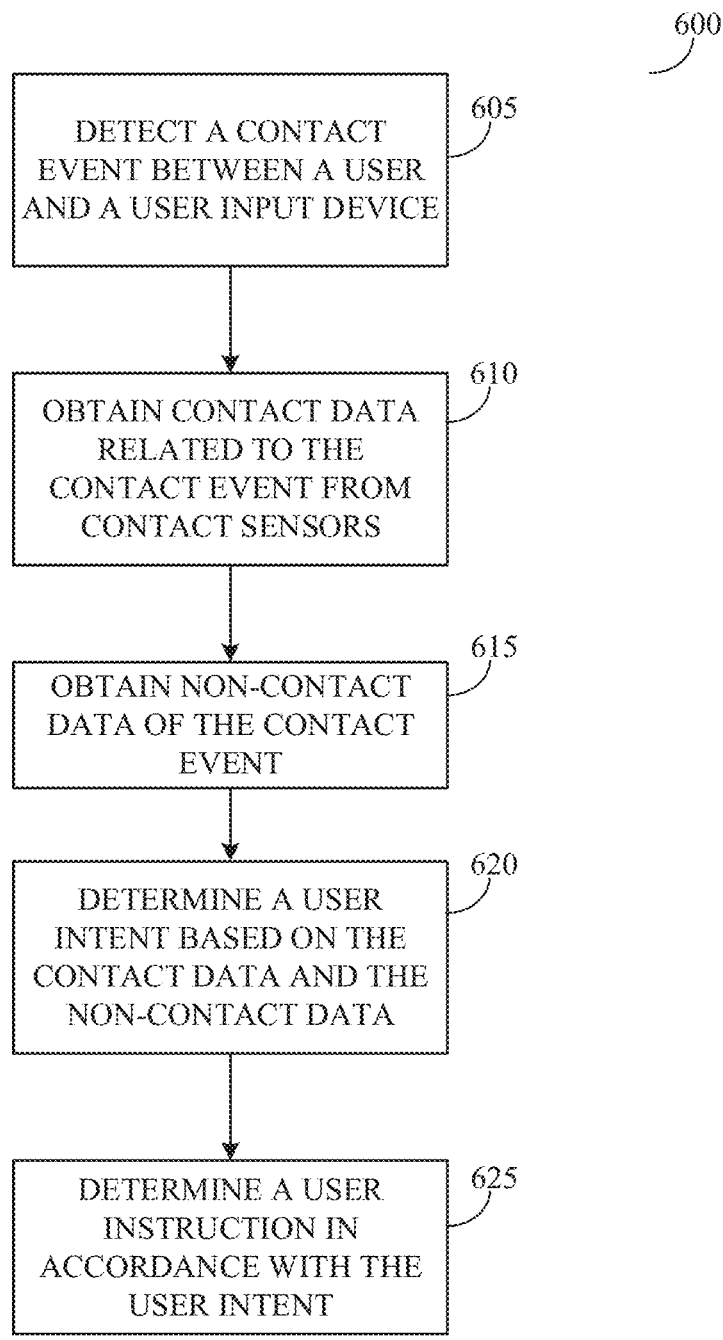
FIG. 6 shows a flowchart of a technique for using a combination of visual and contact sensor data to determine user input, in accordance with one or more embodiments.

Turning to FIG. 6, a flowchart is presented of a technique for using visual and contact data to determine user input, in accordance with one or more embodiments. For purposes of explanation, the following steps will be described in the context of FIG. 5. However, it should be understood that the various actions may be performed by alternate components. In addition, the various actions may be performed in a different order. Further, some actions may be performed simultaneously, and some may not be required, or others may be added.

The flowchart 600 begins at block 605, where a contact event is detected between a user and a user input device. Then, at block 610, contact data may be obtained related to the contact event from contact sensors. For example, touch screens, track pads, and the like may include touch-based sensors which detect contact between a user and the user input device. In some embodiments, the contact sensor may rely on some initial preprocessing to eliminate false positives, such as determining a threshold amount of pressure applied to the device, a threshold size of a detected contact, and the like.

The flowchart continues at block 615, where non-contact data is obtained of the contact event. In some embodiments, non-contact data may be captured by a camera or other sensor of the same system as the user input device. Additionally, and/or alternatively, non-contact data may be obtained from a secondary device having one or more non-contact sensors with the contact event in its field of view. In some embodiments, the system comprising the user input device may detect the user input based on the contact data from the contact sensors and, in response, request non-contact data from the camera device or other non-contact sensor device. For example, in some systems, a camera device may capture an ongoing buffer of image data as the camera is active, and the image data may be retrieved in response to the request. Alternatively, the non-contact sensor device may capture the image data in response to the request. As such, in some embodiments, the various sensors may work independently or in concert.

At block 620, the system determines a user intent based on the contact data and the image data. The process for determining user intent based on the contact data and image data will be described in greater detail below with respect to FIGS. 7-8. In some embodiments, a preliminary user intent may be determined based on the contact information and may be confirmed based on the visual information. Alternatively, the system may consider the combination of contact data and visual data to determine intent. For example, the visual information may be used to determine a particular portion of the user's hand responsible for the user input, which may impact the resulting instruction for the user input. As another example, a machine-learning model may be used to determine a user intent (or, for example, a user input associated with the contact data and visual data) based on the contact data and visual data. In some embodiments, determining the user intent may include determining whether the contact event was an intentional event or an unintentional event.

The flowchart concludes at block 625 where the user input is provided in accordance with the user intent. For example, a user input may be processed or ignored if it is determined that the contact event was unintentional. As another example, if the user input is particular to a characteristic of the contact event that is verifiable by visual data (for example, input by a particular finger), that user input will be provided.

Figure 7A:
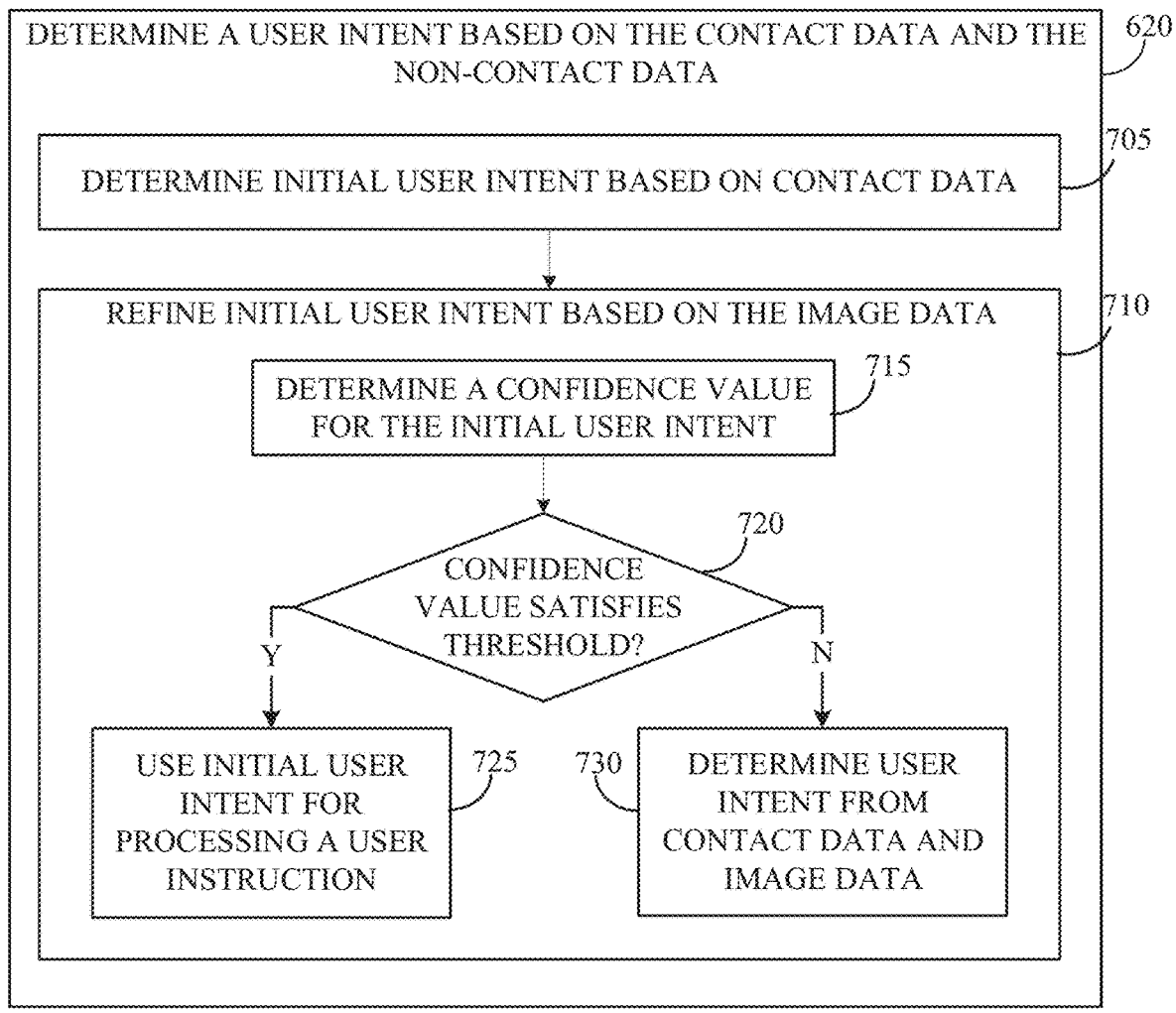
FIGS. 7A-B show flowcharts of techniques for determining intended user input based on contact sensor data and non-contact sensor data, in accordance with one or more embodiments.
Figure 7B:
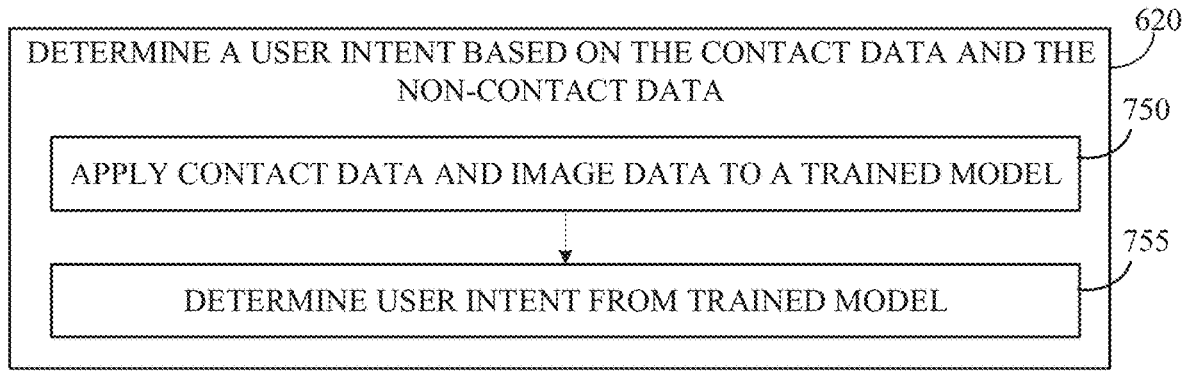

FIGS. 7A-B show flowcharts of techniques for utilizing a combination of contact data and non-contact data for determining user input, in accordance with one or more embodiments. In particular, FIGS. 7A-B depict example techniques for determining a user intent as described above with respect to block 620 of FIG. 6. FIG. 7A depicts a flowchart of a technique for refining an initial user intent based on contact data, in accordance with one or more embodiments. For purposes of explanation, the following steps will be described in the context of FIG. 5. However, it should be understood that the various actions may be performed by alternate components. In addition, the various actions may be performed in a different order. Further, some actions may be performed simultaneously, and some may not be required, or others may be added.

The flowchart begins at block 705 where an initial user intent is determined based on contact data. The initial user intent may be a determination of intended user instruction determined based on contact data detected from one or more contact sensors of a user input device. For example, the press of a spacebar may indicate user entry of a "space," or the touch of a track pad may indicate selection of a user input component over which a cursor is presented. In some embodiments, at block 705, the initial user intent is determined without use of visual data and/or other sensor data. That is, in some embodiments, the sensor data used for determining the initial user intent may be solely the contact sensor data and not additional sensor data.

The flowchart continues at block 710 where the initial user intent is refined based on the image data. For example, in some embodiments, the initial user intent may be refined based on visual data captured by a camera, where the visual data captures the contact event. As described above, the camera may be part of the same system as the user input device from which the contact event is detected, and/or the camera may be part of a separate device receiving instructions from the device from which the contact event is detected.

In some embodiments, as shown at block 715, refining the initial intent may include determining a confidence value for the initial user intent. That is, in some embodiments, the contact sensor data may be associated with and/or may include a confidence value indicating the likelihood that a contact event actually occurred and/or intentionally occurred. For example, a confidence value may be determined based on a size of the contact detected by the contact sensor(s), a pressure applied to the contact sensor(s), and/or contextual information, such as data presented on a display screen during the contact event. In some embodiments, the confidence value may be determined to reduce or eliminate false recognition and/or to improve the user experience.

The flowchart continues at block 720 where a determination is made as to whether the confidence value satisfies a threshold. For example, in some embodiments the threshold value may be a confidence value at which it is determined that the contact event was intentional and/or that the user intent is determinable by the contact event. If at block 720 a determination is made that the confidence value satisfies a threshold, then the flowchart continues to block 725 where the initial user intent is used for processing a user instruction. For example, the user instruction processed in response to the contact event may be based on the initial user intent, as determined at block 705. In some embodiments, the user intent may be determined, for example, based on a particular portion of the contact surface on which the contact event is detected, a determination of a user input component on a user interface over which a cursor is presented when the user input is detected, a portion of the user input device at which the contact event is detected, and the like.

Returning to block 720, if a determination is made that the confidence value does not satisfy the threshold, then the flowchart continues at block 730 and a user intent is determined from the contact data as well as image data captured from a camera with the contact event in its field of view. In some embodiments, the user intent may be refined by confirming the initial user intent. For example, if a confidence value does not satisfy a threshold because of a size and/or pressure applied to a particular portion of a user input device, then the visual information from the image data may be used to confirm the initial user intent. As another example, if the confidence value does not satisfy a threshold because the contact event may be associated with multiple user instructions (for example, if the particular instruction for a contact event may be based on a particular finger providing the input), then the image data may be used to refine the user intent to determining the user instruction associated with the contact event.

FIG. 7B depicts a flowchart of a technique for determining user intent based on contact data, in accordance with one or more embodiments. In particular, the technique depicted in FIG. 7B depicts an example embodiment for determining user intent as described above with respect to block 620 of FIG. 6. For purposes of explanation, the following steps will be described in the context of FIG. 5. However, it should be understood that the various actions may be performed by alternate components. In addition, the various actions may be performed in a different order. Further, some actions may be performed simultaneously, and some may not be required, or others may be added.

The flowchart begins at block 750 where the contact data and the image data are applied to a trained model. In some embodiments, a machine-learning algorithm may be trained with numerous user input examples to determine false recognitions, corner cases, and improve algorithms for different typing, tracking, holding styles, and the like. As such, the trained model may account for contact data, visual data, and the like. For example, the camera may provide two-dimensional image data, three-dimensional image data, depth data, and the like. Additionally or alternatively, additional sensors may be used, such as depth sensors and other non-contact sensors.

The flowchart continues at block 755 where the user intent is determined from the trained model. In some embodiments, the user intent may include determining whether the contact event was intentional or unintentional, as described above. As another example, an intent for the contact event may be refined if the contact event may be associated with multiple user instructions (for example, if the particular instruction for a contact event may be based on a particular finger providing the input).

Figure 8:
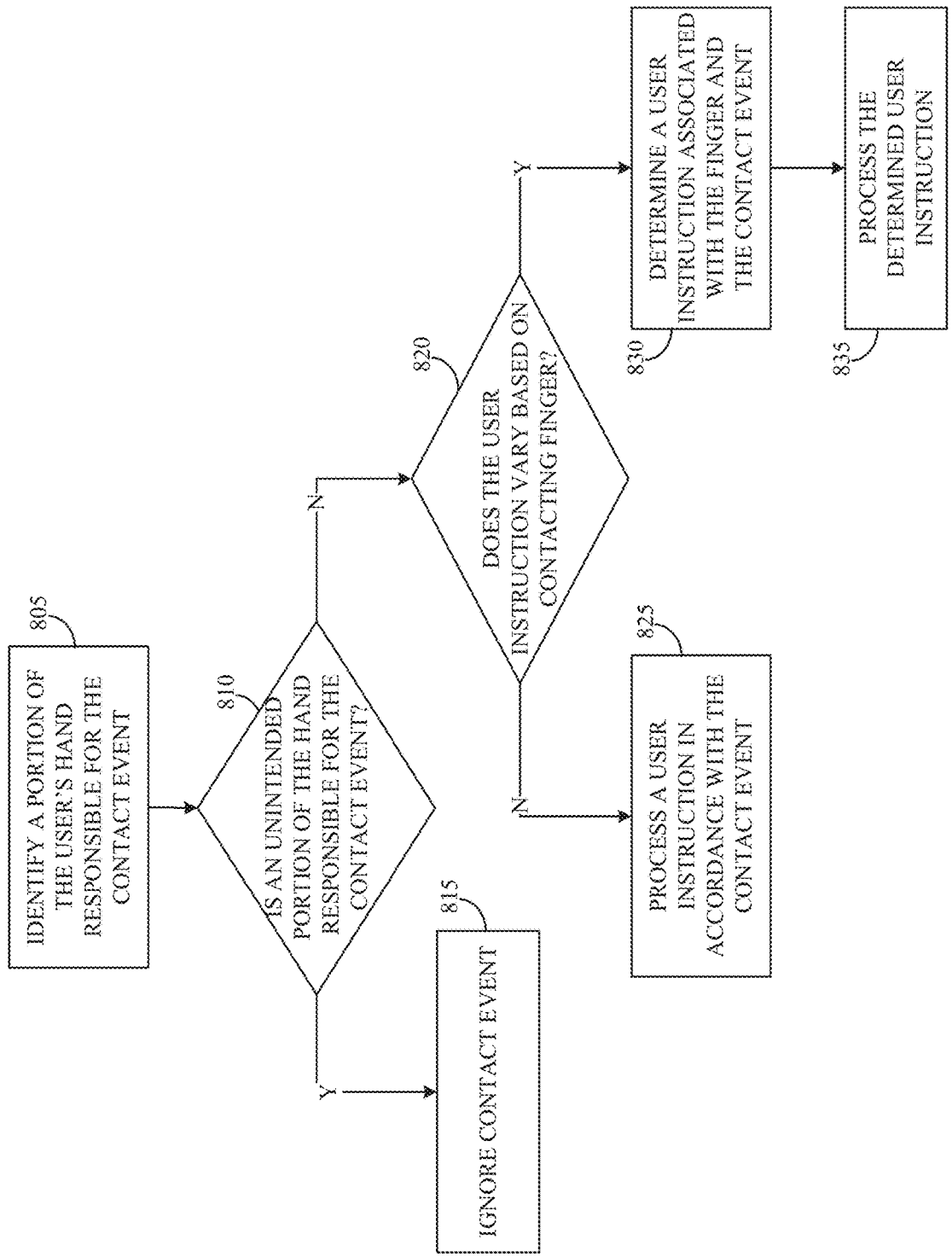
FIG. 8 shows a flowchart for processing contact events in accordance with one or more characteristics of the user input action, in accordance with one or more embodiments.

Turning to FIG. 8, a flowchart is presented for processing contact events in accordance with a touch type, in accordance with one or more embodiments. For purposes of explanation, the following steps will be described in the context of FIG. 5. However, it should be understood that the various actions may be performed by alternate components. In addition, the various actions may be performed in a different order. Further, some actions may be performed simultaneously, and some may not be required, or others may be added.

The flowchart begins at block 805 where a portion of the user's hand responsible for the contact event is determined. For example, in some embodiments, a portion of the hand responsible for the contact event may be considered in determining user intent. As an example, a contact event that is the result of a palm touch may be determined to be unintentional or less likely to be intentional than a contact event that is the result of contact information that is the result of contact by a finger of the user. Further, in one or more embodiments, the techniques described herein may allow for finger disambiguation, by which the user instruction may differ based on which finger is responsible for a contact event.

The flowchart continues at block 810 where a determination is made as to whether a palm or other unintended portion of the user hand is responsible for a contact event. For example, a user's thumb, or other finger may unintentionally cause the contact event. The determination may be made, for example, by determining a portion of the user input device at which contact is detected based on contact data and determining, from visual data, a portion of the user's had hovering over and/or making contact with a portion of the user input device at which the contact event is detected. Accordingly, at block 810, the determination may be made based on a determination as to whether a palm is visible in the image data as hovering over and/or making contact with the portion of the user input device at which the contact event is detected. According to some embodiments, whether the portion of the user's hand was intended for user input may be a task-based determination. In some tasks, user hand movements may include intentional use of palms or any number of fingers. A determination of intent may incorporate knowledge of the specific task, allowable input types, and contextual information about hand orientation and movements during the task.

If a determination is made at block 810 that a palm is responsible for the contact event, then the flowchart continues at block 815 and the contact event is ignored. For example, a determination may be made that the contact event is an unintentional event based on the determination that the palm is responsible for the contact event, in accordance with one or more embodiments.

Returning to block 810, if a determination is made that the palm is not responsible for the contact event, then the flowchart continues at block 820, and a determination is made as to whether the user instruction varies based on the contacting finger. Said another way, a determination may be made as to whether the user instructions provided in response to the detecting contact event may vary based on the finger responsible for the contact event. If a determination is made at block 820 that the user instructions do not vary based on the contacting finger, then the flowchart continues to block 825 and the user instruction is processed in accordance with the contact event. For example, in some embodiments, the user instruction may simply be determined based on the contact data and in accordance with a determination that the contact event is an intentional contact event.

Returning to block 820, if a determination is made that the user instruction varies based on the contacting finger, then the flowchart continues to block 830 and a user instruction is determined in accordance with the contacting finger and the contact event. For example, the user instruction may be determined based on the particular finger responsible for the contact event and a portion of the user input device at which the contact event is detected. In some embodiments, the instruction may be determined by musing information from multiple sensors, such as contact sensors, force sensors, and the like. The flowchart concludes at block, 835 where the user instruction is processed.

Figure 9:
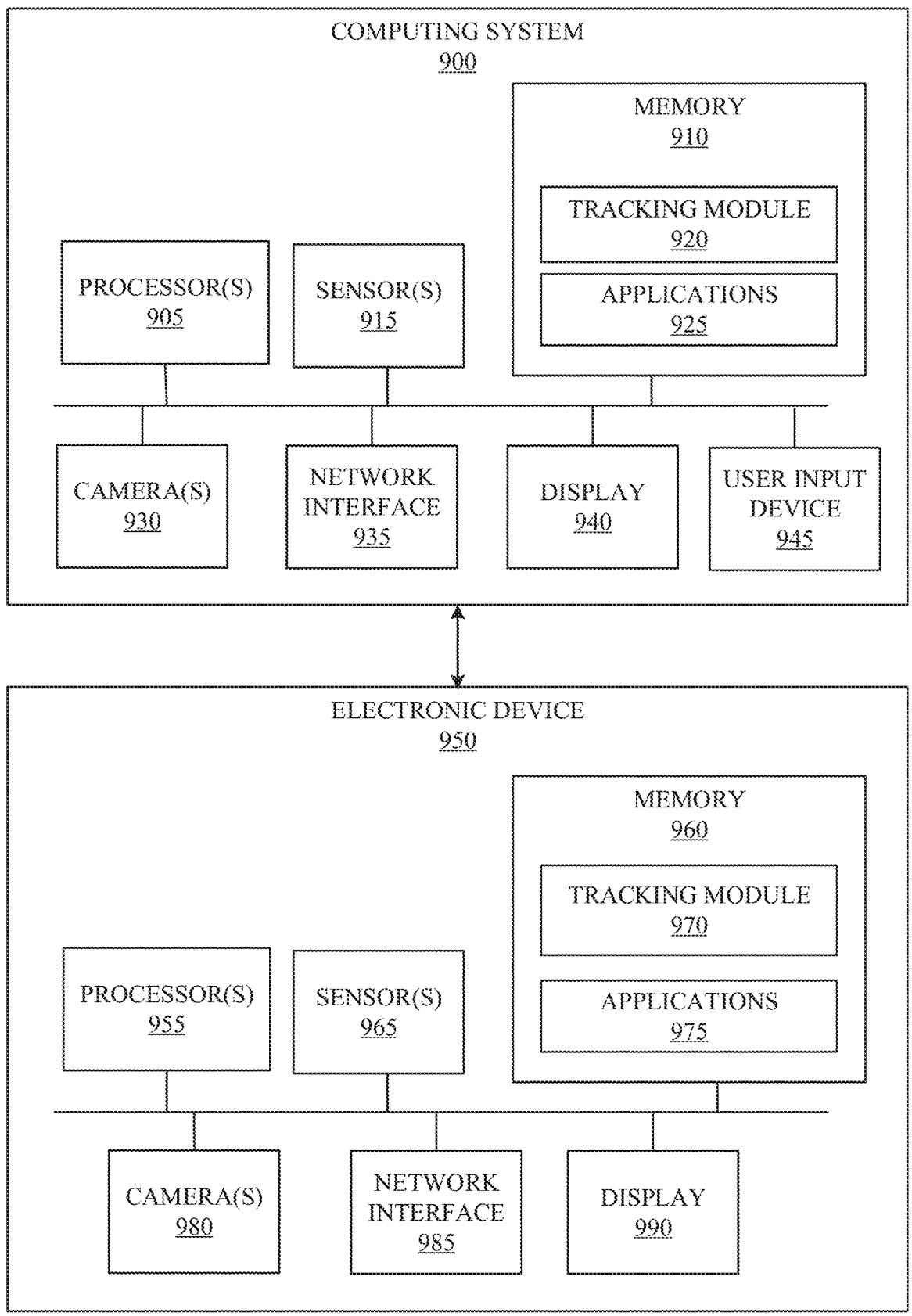
FIG. 9 shows, in block diagram form, a simplified system diagram according to one or more embodiments.

Referring to FIG. 9, a simplified block diagram of a network of computing devices which may be utilized to provide vision-based tracking on a physical keyboard. The system diagram includes computing system 900, which may include various components, including a user input device 945 such as a physical, or contact-based, keyboard 945 as shown at computer system 102 of FIG. 1, 508 of FIG. 5A, or 558 of FIG. 5B. Computing system 900 may be part of a multifunctional device, such as a laptop computer, desktop computer, network device, or other device for which a physical keyboard is utilized to provide user input. The keyboard 945 may be incorporated into the computing system 900, and/or may be communicably coupled to the computing system 900.

Computing system 900 may include one or more processors 905, such as a central processing unit (CPU). Processor(s) 905 may include a system-on-chip such as those found in mobile devices and include one or more dedicated graphics processing units (GPUs). Further, processor(s) 905 may include multiple processors of the same or different type. Computing system 900 may also include a memory 910. Memory 910 may include one or more different types of memory, which may be used for performing device functions in conjunction with processor(s) 905. Memory 910 may store various programming modules for execution by processor(s) 905, including tracking module 920 and other various applications 925.

In some embodiments, the computing system 900 may include other components utilized for vision-based touch detection, such as one or more cameras 930 and/or other sensors 915, such as one or more depth sensors. In one or more embodiments, each of the one or more cameras 930 may be a traditional RGB camera, a depth camera, or other camera type. Further, cameras 930 may include a stereo camera or other multicamera system, a time-of-flight camera system, or the like which captures images from which depth information of the scene may be determined. Computing system 900 may also include a display device 940. Display 940 may be used, for example, to display user interfaces associated with applications 925.

In one or more embodiments, tracking module 920 may estimate whether a criterion has been met to transition the functionality of a physical keyboard to a tracking-based input device, for example, using vision-based systems. In some embodiments, the tracking module 920 may determine that a touch has occurred (i.e., contact has been made) between a user's hand and the physical keyboard. The tracking module 920 may determine the likelihood that contact has been made between the user's hand and the physical keyboard. The tracking module 920 may determine when a touch occurs, for example, by obtaining depth information for a touching object and the surface. As an example, the tracking module 920 may receive or obtain depth information from the camera(s) 930, a depth sensor or other sensors 915. Further, the tracking module 920 may determine touch information from other data, such as stereo images captured by camera(s) 930, and the like. The tracking module 920 may then determine, based on the touch information, that a touch event has occurred. In one or more embodiments, the estimation may be based on a predefined model of a finger or other touching object and/or the physical keyboard. In one or more embodiments, tracking module 920 may also estimate the distance between a user and the physical keyboard. According to one or more embodiments, raw touch data may indicate a likelihood that a touch has occurred based on, for example, a determined measured distance between the touching object and the target surface. A touch may be determined to have occurred, for example, based on a predetermined or dynamically determined threshold estimation value for determining a touch. Further, the touch status may be determined in relation to the physical keyboard. In one or more embodiments, determining the pose of the target surface and the pose of the touching object in a common coordinate system may allow the tracking module 920 to determine a relative distance between the touching object and the target surface and/or other components in the environment.

In one or more embodiments, computing system 900 may communicably connect to electronic device 950, for example, via network interface 935. In some embodiments, some of the components and processes utilized for determining an input mode of a physical keyboard may be found on one or more devices external to computing system 900, such as electronic device 950. Electronic device 950 may be part of a multifunctional device, such as a phone, tablet computer, personal digital assistant, portable music/video player, wearable device, head-mounted device, base station, laptop computer, desktop computer, network device, or any other electronic device. Electronic device 950 may be connected to computing system 900 via a network interface 985 over a network, such as a wired connection, Bluetooth or other short-range connection, among others.

Electronic device 950 may include a processor or processors, such as processor 955. Processor 955 may include multiple processors of the same or different type. Electronic device 950 may also include a memory 960. Memory 960 may include one or more different types of memories, which may be used for performing device functions in conjunction with processor 955. Memory 960 may store various programming modules for execution by processor 955, including tracking module 970. Electronic device 950 may be part of a multifunctional device, such as a phone, tablet computer, personal digital assistant, portable music/video player, wearable device, head-mounted device, base station, laptop computer, desktop computer, network device, or any other electronic device.

In one or more embodiments, the electronic device 950 may include other components utilized for vision-based touch detection, such as one or more cameras 980 and/or other sensors such as depth sensor 965. In one or more embodiments, each of the one or more cameras 980 may be a traditional RGB camera, a depth camera, or the like. Further, cameras 980 may include a stereo camera or other multicamera system, a time-of-flight camera system, or the like which captures images from which depth information of the scene may be determined.

In some embodiments, tracking module 970 provides the same or similar functionality as that described above with respect to tracking module 920. In some embodiments, tracking module 970 detects a movement of a user's hand or other touching object in relation to user input device 945. The movement may be obtained, for example, based on hand tracking techniques or object tracking techniques, such as those described above, using cameras 980 and/or sensors 965. Based on the movement, the tracking module 970 may determine whether user input to user input device 945 should be obtained in a tracking mode or in a typing mode. Additionally or alternatively, tracking module 970 may be utilized to gather vision-based data related to tracking the hand and transmitting the data to the computing system 900 to use to determine whether to obtain user input from the physical keyboard in typing mode or in tracking mode. As described above, the movement may be determined to be associated with a tracking mode based on various factors. For example, the tracking module 970 may consider a touch location at which the user's hand or touching object makes contact with the keyboard, a type of movement on the keyboard, and the like. Further, in some embodiments, the tracking module may track additional contextual information, such as gaze information collected from sensors 965. In some embodiments, the tracking module 970 may determine a gaze location associated with a location on the display 990, and/or a user interface component presented at the determined location on the display. In some embodiments, a combination of data may be utilized, such as determining whether the determined movement matches a gaze direction. For example, if a user performs a swiping action on the physical keyboard, and the user is gazing at a scrollbar, then the tracking mode is likely to be used. Alternatively, if a user performs the swiping action while looking at an area outside the display 990, then the tracking mode is less likely to be used.

In some embodiments, the tracking module 970 may detect predefined movements to determine what user input is provided in the tracking mode. The user input for a particular movement may be determined based on multiple factors. For example, in some embodiments, the user input for a particular movement may be based on a gesture recognized in the movement, a portion of the hand making contact with the physical keyboard, such as a particular finger or fingers, a particular location on the keyboard, and the like. Further, the particular user input for a movement may be determined by also taking into consideration gaze information or a movement type, such as a tap or swipe on the keyboard. According to one or more embodiments, the tracking module may include a sensor fusion algorithm that merges touch, force, image data, and/or other non-contact data to determine user intent.

In some embodiments, user input device 945 may include one or more devices from which a user may provide contact-based input. The user input device 945 may be associated with one or more contact-based sensors, which may be part of the user input device 945 and/or may be part of sensor(s) 965. The user input device may include, for example, a touch screen, a track pad, a physical keyboard, and the like. Further, tracking module 920 and/or tracking module 970 may determine a user instruction associated with the user input and/or determine whether a contact event associated with the user input device 945 is an intentional event or an unintentional event. The determination may be based on contact data from one or more contact-based sensor(s) 915 and/or sensor(s) 965 associated with the user input device 945 and image data from camera(s) 920 and/or camera(s) 980.

Although computing system 900 and electronic device 950 are depicted as comprising the numerous components described above, and one or more embodiments, the various components and functionality of the components may be distributed differently across the devices or located within a single device. Further, in one or more embodiments, computing system 900 and electronic device 950 may be comprised of multiple devices in the form of an electronic system. Accordingly, although certain calls and transmissions are described herein with respect to the particular systems as depicted, in one or more embodiments, the various calls and transmissions may be differently directed based on the differently distributed functionality. Further, additional components may be used, or some combination of the functionality of any of the components may be combined.

Figure 10:
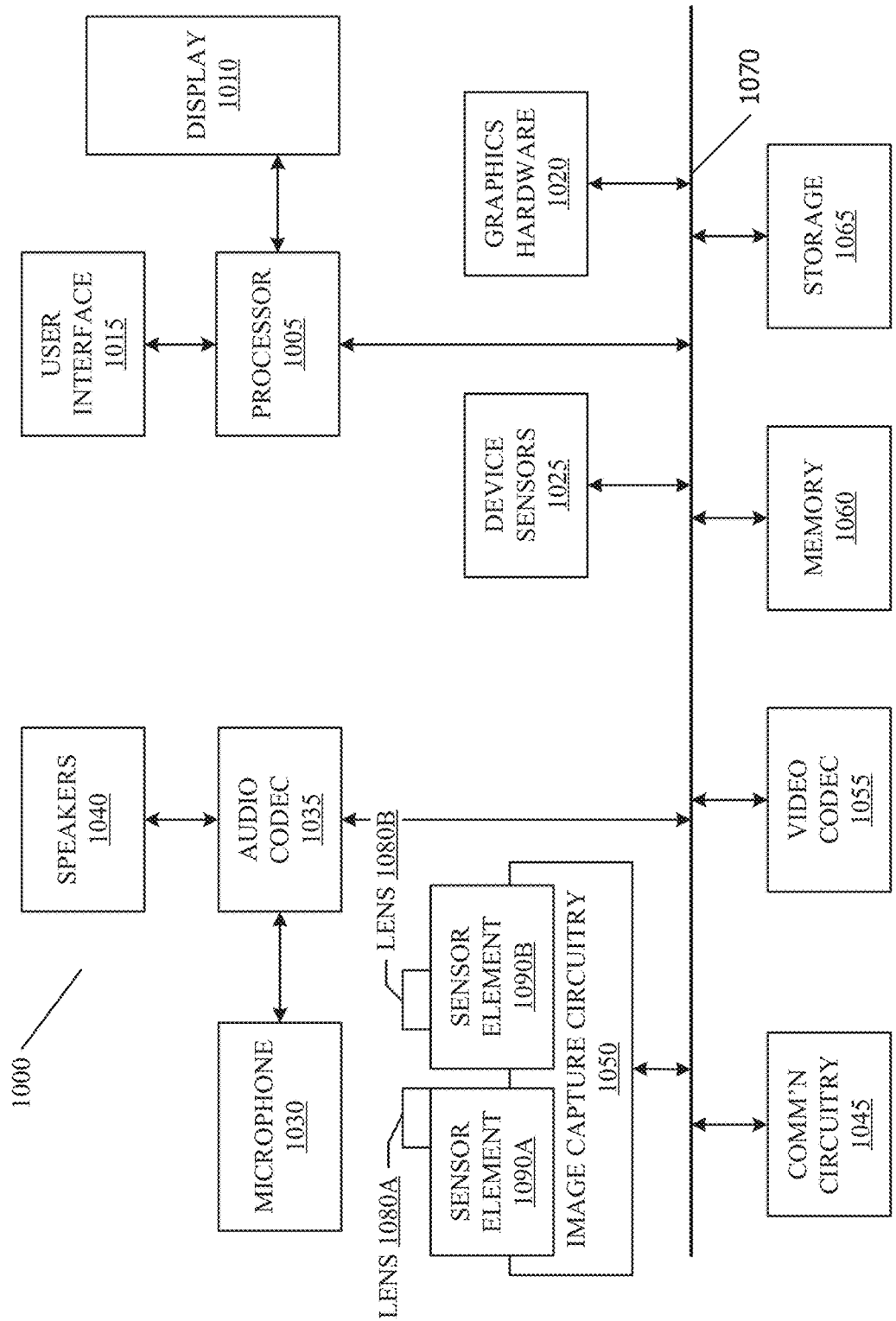
FIG. 10 shows, in block diagram form, a computer system in accordance with one or more embodiments.

Referring now to FIG. 10, a simplified functional block diagram of an illustrative multifunction electronic device 1000 is shown according to one embodiment, such as those described above with respect to computing system 900 and electronic device 950 of FIG. 9. Each of the electronic devices may be a multifunctional electronic device or may have some or all of the described components of a multifunctional electronic device described herein. Multifunction electronic device 1000 may include some combination of processor 1005, display 1010, user interface 1015, graphics hardware 1020, device sensors 1025 (e.g., proximity sensor/ambient light sensor, accelerometer and/or gyroscope), microphone 1030, speaker(s) 1040, communications circuitry 1045, digital image capture circuitry 1050 (e.g., including camera system), memory 1060, storage device 1065, and communications bus 1070. Multifunction electronic device 1000 may be, for example, a mobile telephone, personal music player, wearable device, tablet computer, and the like.

Processor 1005 may execute instructions necessary to carry out or control the operation of many functions performed by device 1000. Processor 1005 may, for instance, drive display 1010 and receive user input from user interface 1015. User interface 1015 may allow a user to interact with device 1000. For example, user interface 1015 can take a variety of forms, such as a button, keypad, dial, a click wheel, keyboard, display screen, touch screen, and the like. Processor 1005 may also, for example, be a system-on-chip such as those found in mobile devices and include a dedicated GPU. Processor 1005 may be based on reduced instruction-set computer (RISC) or complex instruction-set computer (CISC) architectures or any other suitable architecture and may include one or more processing cores. Graphics hardware 1020 may be special-purpose computational hardware for processing graphics and/or assisting processor 1005 to process graphics information. In one embodiment, graphics hardware 1020 may include a programmable GPU.

Image capture circuitry 1050 may include one or more lens assemblies, such as lens assemblies 1080A and 1080B. The lens assemblies may have a combination of various characteristics, such as differing focal length and the like. For example, lens assembly 1080A may have a short focal length relative to the focal length of lens assembly 1080B. Each lens assembly may have a separate associated sensor element 1090A and 1090B. Alternatively, two or more lens assemblies may share a common sensor element. Image capture circuitry 1050 may capture still images, video images, enhanced images, and the like. Output from image capture circuitry 1050 may be processed, at least in part, by video codec(s) 1055 and/or processor 1005 and/or graphics hardware 1020, and/or a dedicated image processing unit or pipeline incorporated within image capture circuitry 1050. Images so captured may be stored in memory 1060 and/or storage 1065.

Memory 1060 may include one or more different types of media used by processor 1005 and graphics hardware 1020 to perform device functions. For example, memory 1060 may include a memory cache, read-only memory (ROM), and/or random access memory (RAM). Storage 1065 may store media (e.g., audio, image and video files), computer program instructions or software, preference information, device profile information, and any other suitable data. Storage 1065 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 1060 and storage 1065 may be used to tangibly retain computer program instructions or code organized into one or more modules and written in any desired computer programming language. When executed by, for example, processor 1005, such computer program code may implement one or more of the methods described herein.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-4, and 6-8, or the arrangement of elements shown in FIGS. 1, 5, 9, and 10 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method comprising:
   obtaining sensor data for a hand of a user in relation to a physical input device, comprising:
      obtaining contact data from one or more contact sensors of the physical input device, and
      obtaining non-contact data for the hand of the user from one or more non-contact sensors, wherein the one or more contact sensors are different than the one or more non-contact sensors;
   classifying the sensor data as satisfying a tracking mode based on the contact data and the non-contact data; and
   processing the sensor data to obtain first user input in accordance with the tracking mode.

2. The method of claim 1, further comprising:
   determining a portion of the hand of the user making contact with the physical input device; and
   classifying the sensor data based on the portion of the user making contact with the physical input device.

3. The method of claim 1, wherein classifying the sensor data as satisfying a tracking mode comprises receiving an indication that a tracking mode has been initiated by a user.

4. The method of claim 1, wherein classifying the sensor data as satisfying a tracking mode comprises detecting that the hand of the user performs a predetermined hand gesture.

5. The method of claim 1, wherein classifying the sensor data as satisfying a tracking mode comprises:
   determining a confidence value associated with the classification of the sensor data; and
   determining that the confidence value satisfies a confidence threshold.

6. The method of claim 5, wherein the confidence value is determined in part based on a gaze direction of the user.

7. The method of claim 6, wherein the confidence value is determined in part based on detected movement of one or more fingers of the hand.

8. A non-transitory computer readable medium comprising computer readable code executable by one or more processors to:
   obtain sensor data for a hand of a user in relation to a physical input device, comprising:
      obtaining contact data from one or more contact sensors of the physical input device, and
      obtaining non-contact data for the hand of the user from one or more non-contact sensors, wherein the one or more contact sensors are different than the one or more non-contact sensors;
   classify the sensor data as satisfying a tracking mode based on the contact data and the non-contact data; and
   process the sensor data to obtain first user input in accordance with the tracking mode.

9. The non-transitory computer readable medium of claim 8, further comprising computer readable code to:
   determine a portion of the hand of the user making contact with the physical input device; and
   classify the sensor data based on the portion of the user making contact with the physical input device.

10. The non-transitory computer readable medium of claim 8, wherein the computer readable code to classify the sensor data as satisfying a tracking mode comprises computer readable code to receive an indication that a tracking mode has been initiated by a user.

11. The non-transitory computer readable medium of claim 8, wherein the computer readable code to classify the sensor data as satisfying a tracking mode comprises computer readable code to detect that the hand of the user performs a predetermined hand gesture.

12. The non-transitory computer readable medium of claim 8, wherein the computer readable code to classify the sensor data as satisfying a tracking mode comprises computer readable code to:
   determine a confidence value associated with the classification of the sensor data; and
   determine that the confidence value satisfies a confidence threshold.

13. The non-transitory computer readable medium of claim 12, wherein the confidence value is determined in part based on a gaze direction of the user.

14. The non-transitory computer readable medium of claim 13, wherein the confidence value is determined in part based on detected movement of one or more fingers of the hand.

15. A system comprising:
   one or more processors; and
   one or more computer readable media comprising computer readable code executable by the one or more processors to:
      obtain sensor data for a hand of a user in relation to a physical input device, comprising:
         obtaining contact data from one or more contact sensors of the physical input device, and
         obtaining non-contact data for the hand of the user from one or more non-contact sensors, wherein the one or more contact sensors are different than the one or more non-contact sensors;
      classify the sensor data as satisfying a tracking mode based on the contact data and the non-contact data; and
      process the sensor data to obtain first user input in accordance with the tracking mode.

16. The system of claim 15, further comprising computer readable code to:
   determine a portion of the hand of the user making contact with the physical input device; and
   classify the sensor data based on the portion of the user making contact with the physical input device.

17. The system of claim 15, wherein the computer readable code to classify the sensor data as satisfying a tracking mode comprises computer readable code to receive an indication that a tracking mode has been initiated by a user.

18. The system of claim 15, wherein the computer readable code to classify the sensor data as satisfying a tracking mode comprises computer readable code to detect that the hand of the user performs a predetermined hand gesture.

19. The system of claim 15, wherein the computer readable code to classify the sensor data as satisfying a tracking mode comprises computer readable code to:
   determine a confidence value associated with the classification of the sensor data; and
   determine that the confidence value satisfies a confidence threshold.

20. The system of claim 19, wherein the confidence value is determined in part based on a gaze direction of the user.

* * * * *